(12) United States Patent
Barnhart et al.

(10) Patent No.: US 10,585,215 B2
(45) Date of Patent: Mar. 10, 2020

(54) REDUCING OPTICAL DAMAGE ON AN OPTICAL ELEMENT

(71) Applicant: Cymer, LLC, San Diego, CA (US)

(72) Inventors: Donald Barnhart, San Diego, CA (US); Eric Anders Mason, San Diego, CA (US); Loren Arthur Larson, Orlando, FL (US)

(73) Assignee: Cymer, LLC, San Diego, CA (US)

( * ) Notice: Subject to any disclaimer, the term of this patent is extended or adjusted under 35 U.S.C. 154(b) by 0 days.

(21) Appl. No.: 16/003,520

(22) Filed: Jun. 8, 2018

(65) Prior Publication Data

US 2019/0004218 A1 Jan. 3, 2019

Related U.S. Application Data

(60) Provisional application No. 62/526,429, filed on Jun. 29, 2017.

(51) Int. Cl.
*G02B 17/06* (2006.01)
*G02B 7/182* (2006.01)
(Continued)

(52) U.S. Cl.
CPC ........... *G02B 5/0205* (2013.01); *G02B 5/085* (2013.01); *G02B 5/0891* (2013.01);
(Continued)

(58) Field of Classification Search
CPC ...... G02B 26/00; G02B 17/06; G02B 7/1821; G02B 27/14; G02B 27/0977
(Continued)

(56) References Cited

U.S. PATENT DOCUMENTS 3,436,665 A 4/1969 Rigrod
3,625,585 A 12/1971 Beiser
(Continued)

OTHER PUBLICATIONS

J.P. Allain (2011), "Irradiation Effects on EUV Nanolithography Collector Mirrors," Recent Advances in Nanofabrication Techniques and Applications, Prof. Bo Cui (Ed.), ISBN: 978-953-307-602-7, InTech, Available from: http://www.intechopen.com/books/recent-advances-in-nanofabrication-techniques-and-applications/irradiation-effects-on-euv-nanolithography-collector-mirrors, 29 pages.

*Primary Examiner* — Ryan D Howard
(74) *Attorney, Agent, or Firm* — DiBerardino McGovern IP Group LLC

(57) ABSTRACT

An apparatus reduces optical damage on an optical element that interacts with a light beam. The apparatus includes: an optical system configured to interact with a light beam to perform a modification to one or more aspects of the light beam, an alignment system, and an actuator. The optical system comprises at least one optical element having a surface configured to interact with the light beam, the surface being continuous and non-diffuse. The alignment system is configured to align the light beam relative to the optical element surface so that the light beam interacts with the optical element while the light beam is traveling at a first beam direction relative to the surface of the optical element and the light beam is outputted from the optical element along a second beam direction relative to the surface of the optical element after the light beam and optical element have interacted.

25 Claims, 10 Drawing Sheets

(51) Int. Cl.
  *G02B 5/02*    (2006.01)
  *G02B 27/10*   (2006.01)
  *G02B 27/09*   (2006.01)
  *G02B 26/00*   (2006.01)
  *G02B 5/08*    (2006.01)
  *G02B 27/14*   (2006.01)

(52) U.S. Cl.
  CPC ......... *G02B 7/1821* (2013.01); *G02B 17/06* (2013.01); *G02B 26/00* (2013.01); *G02B 27/0977* (2013.01); *G02B 27/1006* (2013.01); *G02B 27/14* (2013.01)

(58) Field of Classification Search
  USPC .................................................. 359/874, 872
  See application file for complete search history.

(56) References Cited

U.S. PATENT DOCUMENTS

| | | |
|---|---|---|
| 3,895,313 A | 7/1975 | Seitz |
| 3,942,127 A | 3/1976 | Fluhr et al. |
| 4,093,924 A | 6/1978 | Farcy |
| 4,156,852 A | 5/1979 | Hagen |
| 4,345,212 A | 8/1982 | Seppala et al. |
| 4,734,911 A | 3/1988 | Bruesselbach |
| 4,872,179 A | 10/1989 | Nitsche et al. |
| 4,982,166 A | 1/1991 | Morrow |
| 5,309,456 A | 5/1994 | Horton |
| 5,440,143 A | 8/1995 | Carangelo et al. |
| 5,615,043 A | 3/1997 | Plaessmann et al. |
| 5,751,472 A | 5/1998 | Jeys et al. |
| 5,867,329 A | 2/1999 | Justus et al. |
| 7,006,283 B2 | 2/2006 | Lefort et al. |
| 7,087,914 B2 | 8/2006 | Akins et al. |
| 7,164,144 B2 | 1/2007 | Partlo et al. |
| 7,187,820 B1 | 3/2007 | Stone et al. |
| 7,241,038 B2 | 7/2007 | Naniwa et al. |
| 7,307,716 B2 | 12/2007 | Silver |
| 7,369,597 B2 | 5/2008 | Smith et al. |
| 7,372,056 B2 | 5/2008 | Bykanov et al. |
| 7,405,416 B2 | 7/2008 | Algots et al. |
| 8,126,027 B2 | 2/2012 | Algots et al. |
| 8,810,902 B2 | 8/2014 | Sandstrom |
| 2001/0050770 A1* | 12/2001 | Yokota ............ G01J 3/08 356/325 |
| 2004/0015984 A1 | 3/2004 | Oshino et al. |
| 2005/0286599 A1 | 12/2005 | Rafac et al. |
| 2006/0001854 A1 | 1/2006 | Singer et al. |
| 2006/0232772 A1 | 10/2006 | Silver |
| 2006/0255298 A1 | 11/2006 | Bykanov et al. |
| 2007/0242720 A1 | 10/2007 | Eckles et al. |
| 2007/0285638 A1 | 12/2007 | Ravensbergen et al. |
| 2009/0014668 A1 | 1/2009 | Vaschenko |
| 2009/0073412 A1 | 3/2009 | Pazidis et al. |
| 2009/0161201 A1 | 6/2009 | Ershov et al. |
| 2009/0230326 A1 | 9/2009 | Vaschenko et al. |
| 2010/0107733 A1 | 5/2010 | Miklos et al. |
| 2010/0195196 A1 | 8/2010 | Nowak et al. |
| 2010/0294953 A1 | 11/2010 | Vaschenko et al. |
| 2013/0271827 A1 | 10/2013 | Delgado et al. |

* cited by examiner

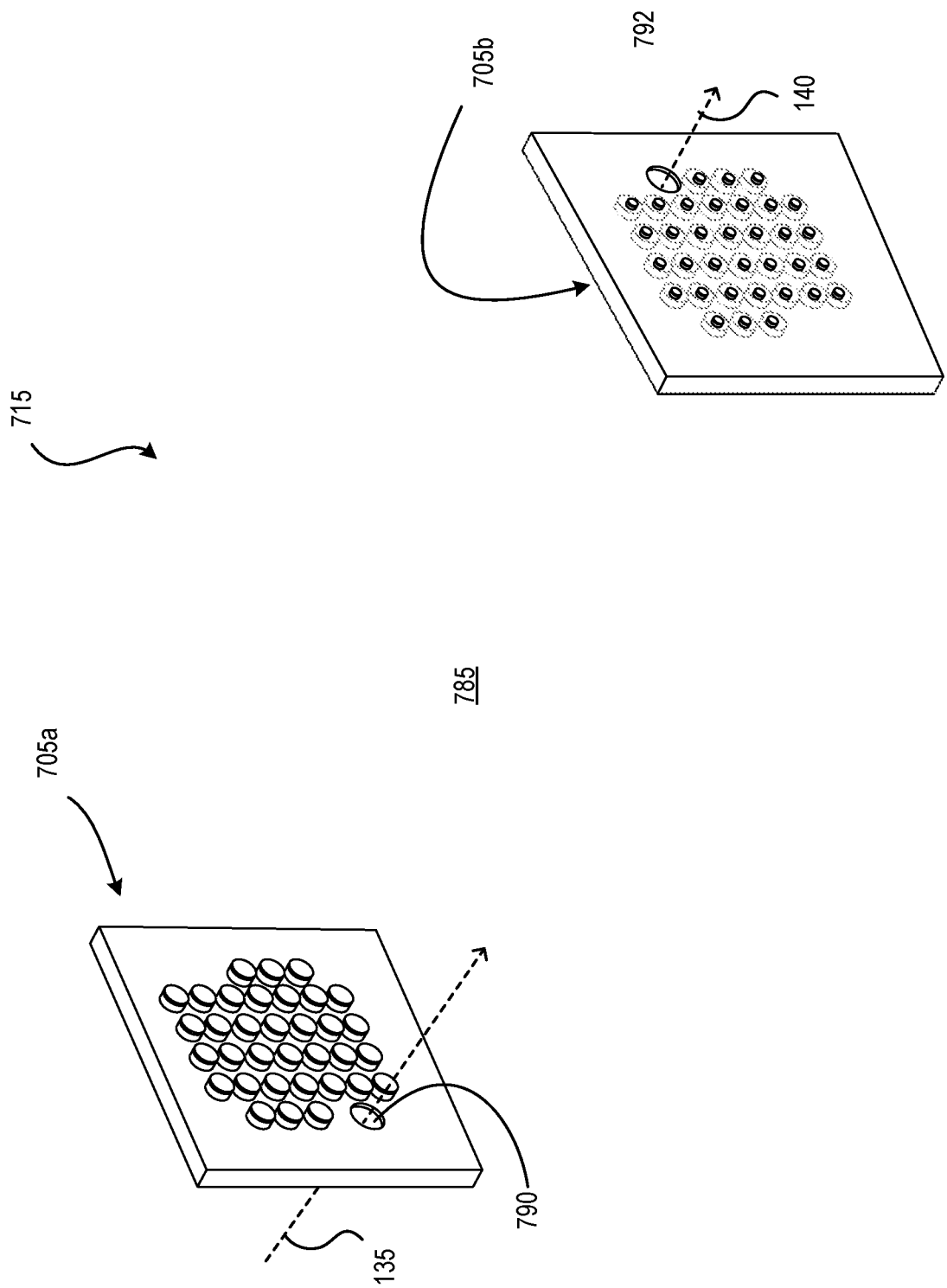

REDUCING OPTICAL DAMAGE ON AN OPTICAL ELEMENT

CROSS REFERENCE TO RELATED APPLICATION

This application claims the benefit of U.S. Application No. 62/526,429, filed Jun. 29, 2017 and titled REDUCING OPTICAL DAMAGE ON AN OPTICAL ELEMENT, which is incorporated herein by reference in its entirety.

TECHNICAL FIELD

The disclosed subject matter relates to reducing optical damage on an optical element within a deep ultraviolet (DUV) light source.

BACKGROUND

In semiconductor lithography (or photolithography), the fabrication of an integrated circuit (IC) includes performing a variety of physical and chemical processes on a semiconductor (for example, silicon) substrate (which is also referred to as a wafer). A photolithography exposure apparatus or scanner is a machine that applies a desired pattern onto a target portion of the substrate. The wafer is irradiated by a light beam that extends along an axial direction, and the wafer is fixed to a stage so that the wafer generally extends along a lateral plane that is substantially orthogonal to the axial direction. The light beam can have a wavelength in the ultraviolet (UV) range, for example, from about 10 nanometers (nm) to about 400 nm, and specifically in either the deep UV (DUV) range, from about 100 nm about 400 nm or in the extreme ultraviolet (EUV) range, less than about 100 nm. The light beam travels along the axial direction (which that is orthogonal to the lateral plane along which the wafer extends).

SUMMARY

In some general aspects, an apparatus reduces optical damage on an optical element that interacts with a light beam. The apparatus includes: an optical system within an ultraviolet light source, the optical system being configured to interact with a light beam to perform a modification to one or more aspects of the light beam, an alignment system, and an actuator. The optical system comprises at least one optical element having a surface configured to interact with the light beam, the surface being continuous and non-diffuse. The alignment system is configured to align the light beam relative to the optical element surface so that the light beam interacts with the optical element while the light beam is traveling at a first beam direction relative to the surface of the optical element and the light beam is outputted from the optical element along a second beam direction relative to the surface of the optical element after the light beam and optical element have interacted. The actuator is physically coupled to the optical element and configured to perform a rotation of the optical element about an axis of rotation. During the interaction between the light beam and the optical element: before the rotation, the light beam interacts with the optical element at a first region of the optical element and while traveling at the first beam direction, and the outputted light beam is directed along the second beam direction; after the rotation, the light beam interacts with the optical element at a second region of the optical element that is distinct from the first region and while traveling at the first beam direction, and the outputted light beam remains directed along the second beam direction; and the modification performed to one or more aspects of the light beam does not change due to the rotation of the optical element.

Implementations can include one or more of the following features. For example, the optical system can include an optical temporal pulse stretcher and the modification performed to the light beam can increase a duration of the pulses of the light beam. The optical temporal pulse stretcher can be a passive optical element. The at least one optical element can include a mirror within the optical temporal pulse stretcher.

The optical temporal pulse stretcher can include a beam separator that divides the light beam into a portion that is directed into an arrangement of a plurality of mirrors, and the at least one optical element can include the mirrors of this arrangement.

The optical element can include a mirror having a reflective surface that interacts with the light beam. The mirror can be a concave mirror. The reflective surface of the mirror can be a spherical surface.

The optical element can be rotationally symmetrical about its centroid, which corresponds to the axis of rotation, and the first and second regions of the optical element can be offset from the centroid of the optical element.

The light beam can be reflected from the optical element along the second beam direction. The actuator can be configured to rotate the optical element about the axis of rotation while the light beam is interacting with the optical element.

At least some of the second region of the optical element can overlap with the first region of the optical element.

The optical element can be configured to withstand a power of the light beam and to optically interact with a light beam having a wavelength in the deep or extreme ultraviolet range.

The actuator can include a servo motor. The actuator can include a stepper motor. The actuator can include a piezo actuator. The actuator can include a piezo inch-worm. The actuator can include a pneumatic actuator mechanically linked to the optical element.

The apparatus can include a control system coupled to the actuator, wherein the control system is configured to send a signal to the actuator to rotate the optical element about the axis of rotation. The apparatus can include a measurement apparatus coupled to the control system, wherein the measurement apparatus is configured to measure one or more characteristics of the optical system and the control system sends a signal to the actuator based on the measured one or more characteristics.

In other general aspects, a method is performed for reducing optical damage on an optical element. The method includes: directing a light beam toward the optical element along a first beam direction to thereby interact the light beam with a surface of the optical element, the surface being continuous and non-diffuse; outputting the light beam from the optical element along a second beam direction after the light beam and optical element have interacted; and performing a rotation of the optical element about an axis of rotation. Before the rotation, the light beam interacts with the optical element at a first region of the optical element surface, and the outputted light beam is directed along the second beam direction. After the rotation, the light beam interacts with the optical element at a second region of the optical element surface that is distinct from the first region and the outputted light beam remains directed along the second beam direction.

Implementations can include one or more of the following features. For example, the optical element can be rotationally symmetrical about its centroid, which is at the axis of rotation, and the first and second regions of the optical element surface can be offset from the centroid of the optical element.

The light beam can be outputted from the optical element along the second beam direction after the light beam and the optical element have interacted by reflecting the light beam from the optical element surface along the second beam direction.

The rotation of the optical element about the axis of rotation can be performed while the light beam is interacting with the optical element surface.

At least some of the second region of the optical element surface can overlap with the first region of the optical element surface.

The optical element can be configured to interact with light having a wavelength in the deep or extreme ultraviolet range.

In other general aspects, a method is performed for reducing optical damage on an optical element. The method includes: directing a light beam toward the optical element along a first beam direction to thereby interact the light beam with a surface of the optical element, the surface being continuous and non-diffuse; outputting the light beam from the optical element along a second beam direction after the light beam and optical element have interacted; and performing a rotation of the optical element about an axis of rotation without changing a behavior of the outputted light beam and without changing the second beam direction. Before the rotation, the light beam interacts with the optical element at a first region of the optical element surface. After the rotation, the light beam interacts with the optical element at a second region of the optical element surface that is distinct from the first region.

Implementations can include one or more of the following features. For example, the rotation of the optical element about the axis of rotation can be performed by rotating the optical element about the axis of rotation repeatedly and at a particular rate.

The rotation of the optical element about the axis of rotation can be performed by rotating the optical element about the axis of rotation continually.

DESCRIPTION OF DRAWINGS

FIG. 7 is a perspective view of an exemplary optical temporal pulse stretcher;

DESCRIPTION

Figure 1A:
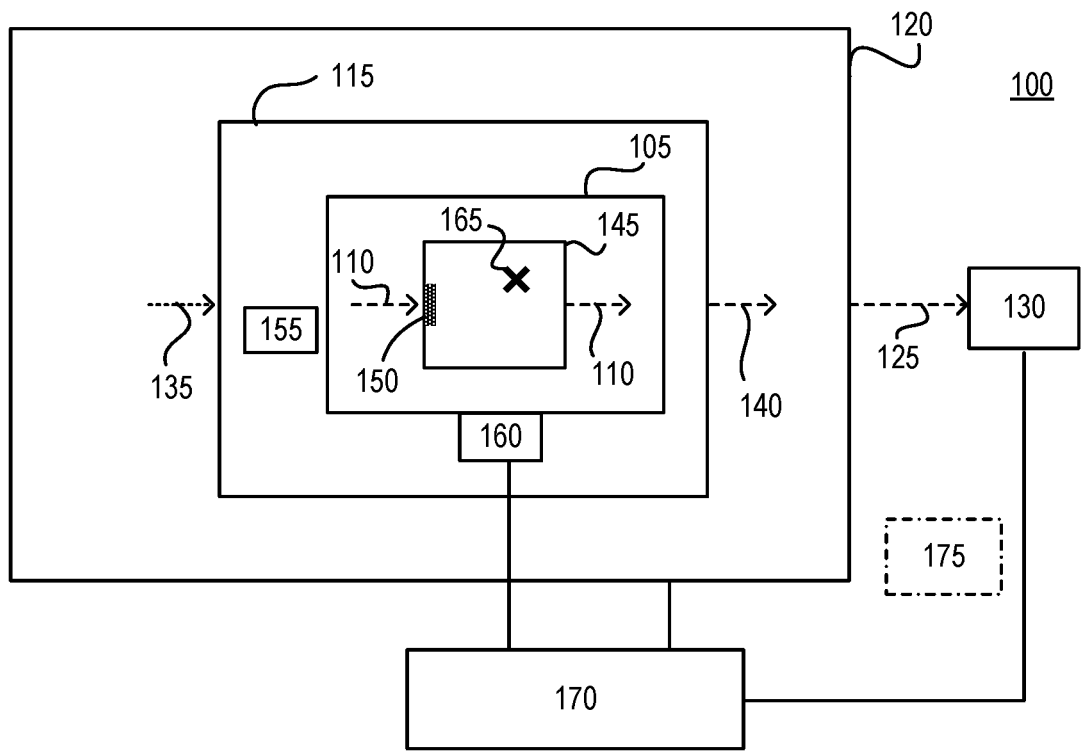
FIG. 1A is a block diagram of an apparatus for reducing optical damage on an optical element that interacts with a light beam by adjusting an interacting region at which the optical element and the light beam interact.
Figure 9:
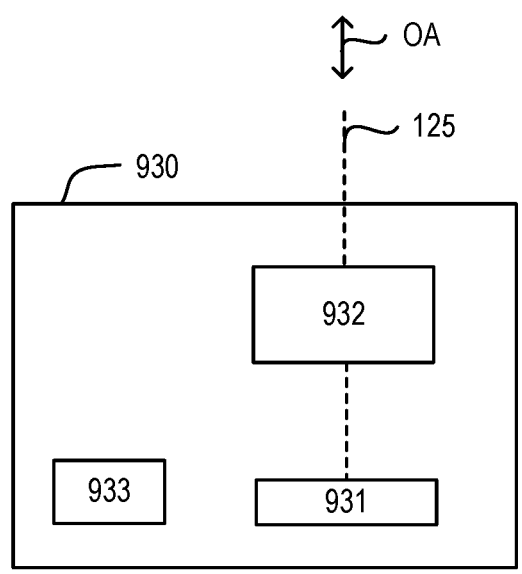
FIG. 9 is a block diagram of an exemplary output apparatus that is a photolithography exposure apparatus.

Referring to FIG. 1A, an apparatus 100 is configured for reducing optical damage on an optical element 105 that interacts with a light beam 110. The apparatus 100 includes an optical system 115 within an ultraviolet light source 120. The ultraviolet light source 120 produces a light beam 125 at its output for use by an output apparatus 130 (such as a photolithography exposure apparatus that patterns microelectronic features on a wafer such as a silicon wafer, as shown in FIG. 9). The output apparatus 130 uses the light beam 125 to perform one or more functions (such as patterning a wafer). The efficiency and quality of the performed functions depend on various characteristics of the light beam 125. The light beam 125 can have a wavelength that is in the UV range, for example, in the deep ultraviolet (DUV) range, for example, from about 100 nanometers (nm) to about 400 nm. The light beam 125 can have a wavelength that is in the extreme ultraviolet (EUV) range, for example, of around 100 nm or less (also sometimes referred to as soft x-rays), and including light at a wavelength of about 13 nm.

The optical system 115 is configured to interact with a light beam 135 to perform a modification to one or more aspects of the light beam 135 and thereby output a modified light beam 140. For example, the light beam 135 could be modified in a manner that improves the performance of the light beam 125 at the output apparatus 130. For example, the optical system 115 can be a system that adjusts a spectral feature of the light beam 135, and this adjustment is required or requested by the output apparatus 130. As another example, the optical system 115 can be a system that adjusts a timing or a direction or a geometry of the light beam 135, and just adjustment enables the performance at the output apparatus 130 to improve.

The light beam 125 is formed from the light beam 140 output from the optical system 115. Thus, in some implementations, the light beam 125 is formed after the light beam 140 has been transformed by other components or hardware within the light source 120 that are not shown in FIG. 1A. While in other implementations in which the optical system 115 is at the output of the light source 120 (and thus the light beam 140 does not undergo any other interactions before exiting the light source 120), then the light beam 125 corresponds to the light beam 140 output from the optical system 115. The light beam 140 is formed from the light beam 110 output from the surface of the optical element 105. Thus, in some implementations, the light beam 140 is formed after the light beam 110 output from the surface 145 has been transformed by other components or hardware within the optical system 115 that are not shown in FIG. 1A.

While in other implementations in which the surface 145 of the optical element 105 is at the output of the optical system 115 (and thus the light beam 110 does not undergo any other interactions before exiting the optical system 115), then the light beam 140 corresponds to the outputted light beam 110. The light beam 110 that impinges on the surface 145 is formed from the light beam 135 directed to the optical system 115. Thus, in some implementations, the light beam that is directed to the surface 145 is formed after the light beam 135 has been transformed by other components or hardware within the optical system 115 that are not shown in FIG. 1A. In other implementations in which the surface 145 of the optical element 105 is at the input of the optical system 115 (and thus the light beam 110 does not undergo any other interactions after entering the optical system 115 but before interacting with the surface 145), then the inputted light beam 110 corresponds to the light beam 135.

The optical system 115 includes at least one optical element 105 having a surface 145 configured to interact with the light beam 110. Because of the relative size between the transverse area of the light beam 110 and the area of the surface 145, the light beam 110 interacts with only a portion of the surface 145 at any one moment in time. This portion of the surface 145 at which the light beam 110 interacts with the surface 145 can be referred to as an interacting region 150. The apparatus 100 is configured to adjust the location of the interacting region 150 while the light source 120 is operating to thereby reduce the overall damage to the surface 145 of the optical element 105 and to extend the lifetime of the optical element 105. The adjustment of the location of the interacting region 150 can also reduce the damage to the substrate on which the surface 145 is affixed. The adjustment to the interacting region 150 of the surface 145 can increase the lifetime of the optical element 105 by a factor of two or more, for example, it can at least double the usable lifetime of the optical element 105.

The adjustment to the interacting region 150 of the surface 145 can be done periodically, randomly, manually, automatically, with feedback, or without feedback, as discussed below. Moreover, this adjustment to the interacting region 150 of the surface 145 is done without impacting or without appreciably impacting how the light beam 135 is modified by the optical system 115 and therefore without impacting the modified light beam 140. For example, if the light beam 110 is reflected from the surface 145 of the optical element 105, then a change or variation in reflectivity across the surface 145 is maintained below about 1% (relative to an average reflectivity). Thus, the reflectivity of the surface 145 as the interacting region 150 is adjusted is maintained within about 1% of an average reflectivity. As another example, the transmission of the surface 145 as the interacting region 150 is adjusted can be maintained within about 1% of an average transmission.

In some implementations, the light beam 135 produced by the light source 120 is a light beam 135 of pulses, and the pulses of the light beam 135 have a wavelength that is nominally at a center wavelength in the ultraviolet range. In this example, the light source 120 emits light in the form of optical pulses, rather than a continuous wave. Thus, the light source 120 emits pulses of energy that have a short time duration. These periodic pulses can be considered a pulse train and form the light beam 135. The duration of a pulse (also called the pulse width or length) can be defined as the time during which the power of the pulse remains continuously above a percentage (for example a half) of its maximum value. In these implementations, the light beam 110 will also be a light beam of pulses, as will the modified light beam 140 and the light beam 125 directed to the output apparatus 130. In other implementations, the light beam 125 produced by the light source 120 is a continuous wave light beam.

Figure 1B:
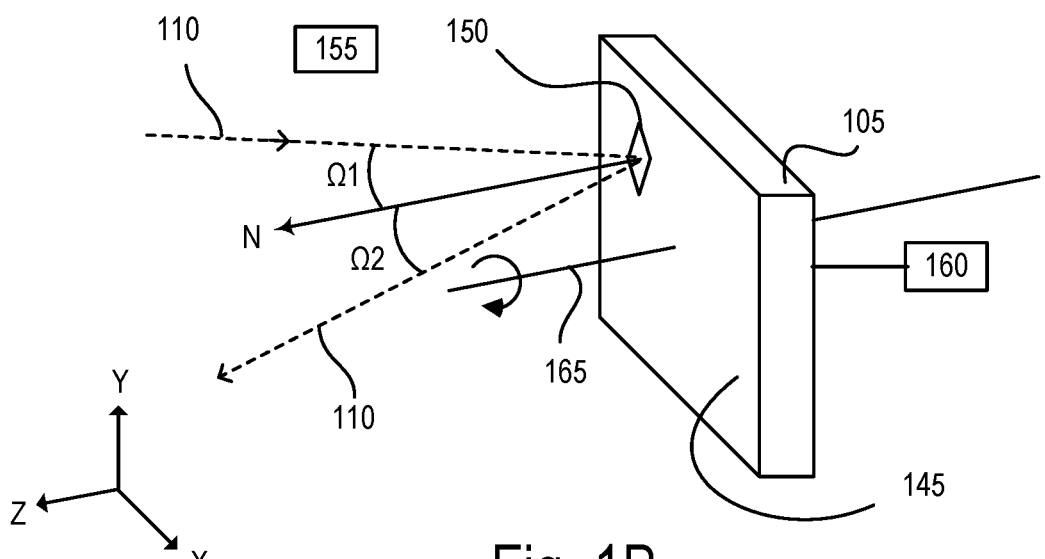
FIG. 1B is a schematic diagram of an exemplary optical element of the apparatus of FIG. 1A.

Referring also to FIG. 1B, the apparatus 100 can include an alignment system 155 configured to align the light beam 110 relative to the optical element surface 145. In this way, the light beam 110 interacts with the optical element 105 while the light beam 110 is traveling at a first beam direction $\Omega 1$ relative to the surface 145 of the optical element 105 and the light beam 110 is outputted from the optical element 105 along a second beam direction $\Omega 2$ relative to the surface 145 of the optical element 105 after the light beam 110 and optical element 105 have interacted. For example, the first beam direction $\Omega 1$ can be measured relative to the surface normal N at the interacting region 150 (the surface normal N is the vector that is perpendicular to the tangent plane to that surface at the interacting region 150) and the second beam direction $\Omega 2$ can be measured relative to the surface normal N at the interacting region 150. The alignment system 155 can be any device or combination of devices such as optical devices that direct the light beam 110 toward the optical element surface 145 within the optical system 115. For example, the alignment system 155 can include one or more reflective optics, refractive optics, diffractive optics, and transmissive optics within the optical system 115.

A Cartesian coordinate system of the optical element 105 is shown. The surface normal N of the surface 145 defines the Z axis, while the plane of the surface 145 is perpendicular to the Z axis and includes at least a portion of the X-Y plane. The location of the interacting region 150 is that region on the surface 145 that interacts with the light beam 110. Thus, the interacting region 150 lies in the X-Y plane of the surface 145. The coordinate system of the optical element 105 can alternatively be given as a cylindrical coordinate system because the optical element 105 is configured to rotate about the Z axis. In a cylindrical coordinate system, the interacting region 150 is more easily defined as lying at a radial distance r from an axis of rotation 165 of the surface 145 and azimuthally positioned at an angle $\theta$ relative to an arbitrary angle position $\theta_0$.

The apparatus 100 also includes an actuator 160 physically coupled to the optical element 105 to adjust the location of the interacting region 150 at which the light beam 110 interacts with the surface 145 while the light source 120 is operating to thereby reduce the overall damage to the surface 145 of the optical element 105. For example, the actuator 160 can be configured to rotate the optical element 105 about an axis of rotation 165. The axis of rotation 165 is shown schematically in FIG. 1A and an example is given in FIG. 1B. The rotation of the optical element 105 about the axis of rotation 165 (about the Z axis) moves the location of the interacting region 150 at which the light beam 110 interacts with the surface 145. Specifically, the radial distance of the interacting region 150 remains unchanged by the rotation while the azimuthal angle is either stepped or continuously changed across the total 360° span.

The actuator 160 is configured to rotate the optical element 105 about the axis of rotation 165 while the light beam 110 is interacting with the optical element 105. The actuator 160 can be any suitable apparatus, including a human operator (manual adjustment) or a machine apparatus that may or may not be under feedback control. The actuator 160 can include one or more of: a servo motor, stepper motor, piezo actuator, piezo inch-worm, and pneumatic actuator mechanically linked to the optical element 105.

Figure 2A:
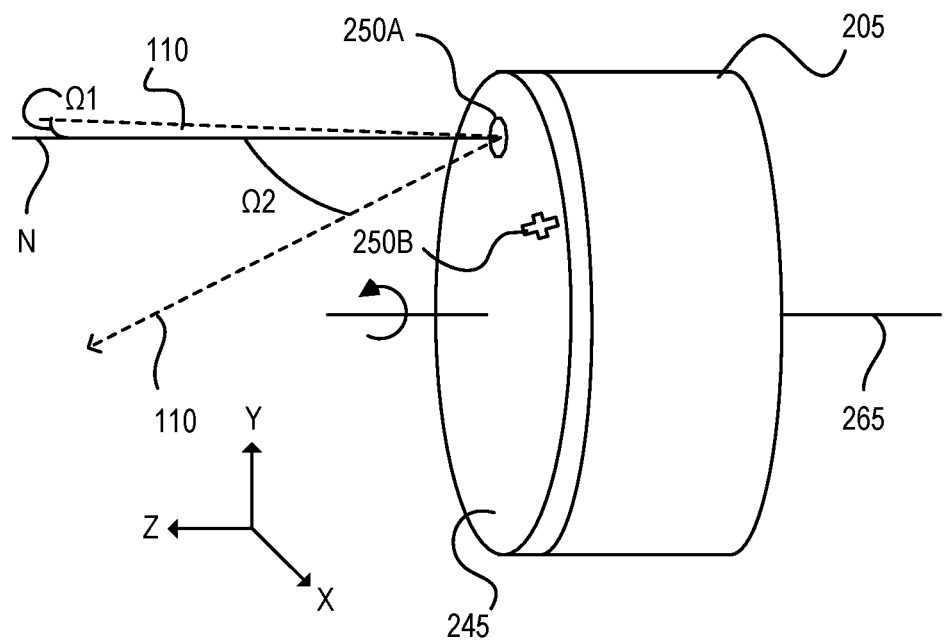
FIG. 2A is a perspective view of an exemplary reflective optical element of the apparatus of FIG. 1A prior to a rotation.
Figure 2B:
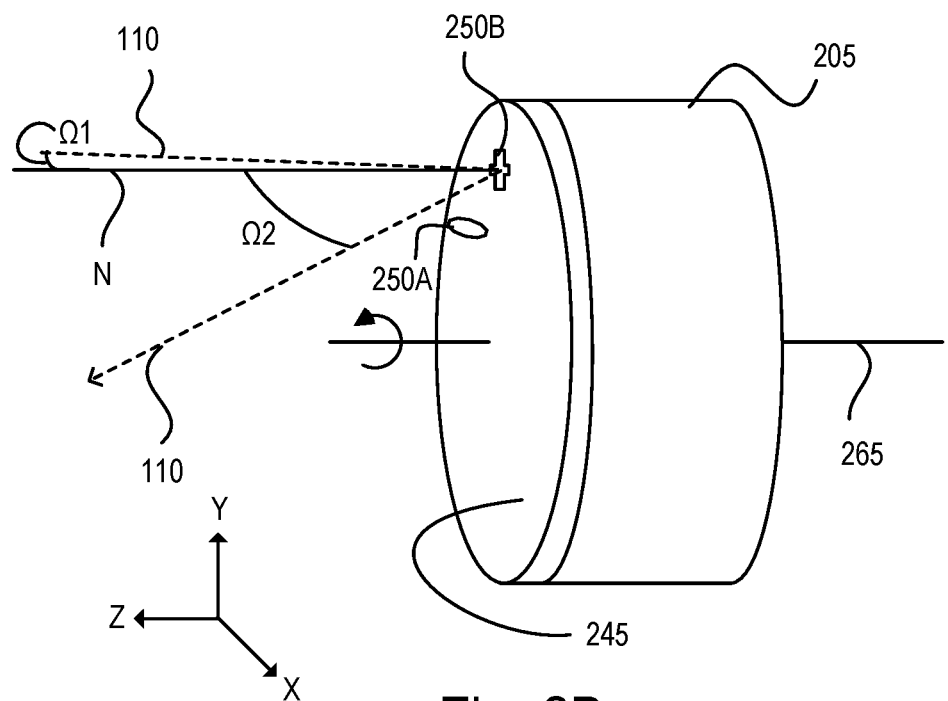
FIG. 2B is a perspective view of the reflective optical element of FIG. 2A after the rotation.

For example, as shown with reference to an exemplary optical element 205 in FIGS. 2A and 2B, before a rotation (FIG. 2A), the light beam 110 interacts with the optical element 205 at a first interacting region 250A of the surface 245 of the optical element 205. The light beam 110 is traveling along the first beam direction $\Omega 1$, and the outputted light beam 110 is directed along the second beam direction $\Omega 2$. After the rotation about the axis of rotation 265 (FIG. 2B), the light beam 110 interacts with the optical element 205 at a second interacting region 250B of the surface 245 of the optical element 205. The second interacting region 250B is distinct from the first interacting region 250B. After the rotation, the light beam 110 is still traveling along the first beam direction $\Omega 1$, and the outputted light beam 110 remains directed along the second beam direction $\Omega 2$. Accordingly, the modification performed to one or more aspects of the light beam 135 by the optical system 115 to form the light beam 140 does not change due to this rotation of the optical element 205.

The first interacting region 250A and the second interacting region 250B in this example are offset radially from the axis of rotation 265, which corresponds to the centroid of the optical element 205. The axis of rotation 265 is positioned so that, even though the optical element 205 is rotated about the axis of rotation 265, the behavior of the light beam 110 as it interacts with the optical element surface 245 remains unchanged. To put it another way, the behavior of the light beam 110 as it interacts with the optical element 245 is independent of the rotation of the optical element 205 about its axis of rotation 265.

Referring again to FIG. 1A, the apparatus 100 can include a control system 170 coupled to the actuator 160 to control operation of the actuator 160. The control system 170 is configured to send a signal to the actuator 160 to rotate the optical element 105 about its axis of rotation 165.

Additionally, the apparatus 100 can include a measurement apparatus 175 coupled to the control system 170. The measurement apparatus 175 is configured to measure one or more characteristics of the optical system 115 and provide those measurements to the control system 170. The control system 170 analyzes these measurements, and adjusts the signal sent to the actuator 160 based on the analysis of these measurements.

The optical element 105 or 205 is any element that interacts with the light beam 110 in an optical manner. Thus, the optical element 105 or 205 changes the behavior or properties of the light beam. In some implementations, the optical element 105 or 205 can be a passive device that does not require any external power to operate, such as, for example, a reflective optical element, diffractive optical element, a refractive optical element, or a transmissive optical element. In other implementations, the optical element 105 or 205 is an active device that relies on external power to operate and it consumes the power.

The surface 145 or 245 of the respective optical element 105, 205 is a smooth surface. The surface 145 or 245 is therefore a continuous surface and is non-diffuse. Any changes to the geometry of the surface 145, 245 are systematic, and non-random. Thus, the surface 145, 245 can include bends, angles, or cusps and still be continuous, but may not be differentiable. For example, the surface 145, 245 can include a grating pattern. The surface 145, 245 can be a smooth and uniform surface that at all points is differentiable. On the other hand, the surface 145, 245 does not include any diffuse or rough structure, or cellular structure. Thus, the surface 145, 245 does not constitute a diffuser surface, which is rough at a microscopic level. The surface 145, 245 is non-porous, which means that it is not porous and lacks pores. Examples of a porous surface would be a diffuser surface or a cellular structure. Because the surface 145, 245 is non-diffuse, it is possible to predict how a light beam incident would interact with the surface 145, 245. Moreover, the interaction between a single light beam and the surface 145, 245 produces a finite number (for example, one or two) of light beams after the interaction.

The surface 145, 245 can be reflective, diffractive, or transmissive to the light beam 110.

The adjustment to the interacting region 150 of the surface 145 of the optical element 105 can be performed on a surface 145 whenever there is sufficient space on the surface 145 for another interacting region 150 of the light beam 110. Moreover, some parameters need to be maintained during such adjustment. For example, the angle of incidence and the orientation of the crystalline axis of the optical element 105 (if the crystalline axis of the optical element 105 is defined) should be maintained. The optical element 105 can be a reflective optic in some implementations, but in other implementations it can be refractive, diffractive, or transmissive. For example, a prism can be translated; a window can be translated or rotated if its crystalline axis is not critically defined to reduce or minimize beam-induced birefringence in the bulk and de-polarization; a beam splitter can be translated; or a lens can be rotated.

The optical element 105 or 205 is configured to withstand the power of the light beam 110 without appreciable degradation in a reasonable period of time of use. Moreover, the optical element 105 or 205 is configured to perform the interaction with the light beam 110 having a wavelength in the deep ultraviolet range or extreme ultraviolet range and thus, the wavelength range at which the optical element 105 or 205 functions efficiently should be in the deep ultraviolet range and/or the extreme ultraviolet range.

The axis of rotation 165 or 265 of the optical element 105, 205 can correspond to its centroid. The centroid can be considered as the center of mass of the optical element 105, 205 taken in the plane of the surface 145, 245. In the example of FIGS. 2A and 2B, the optical element 205 is rotationally symmetrical about its centroid. The first and second interacting regions 250A, 250B of the optical element 205 are offset from the centroid of the optical element 205 along a radial direction. While only one is shown in FIGS. 1A and 1B and only two are shown in FIGS. 2A and 2B, the optical element 105, 205 can have any number of interacting regions 150, 250A, 250B available to interact with the light beam 110.

The size of the interacting region or regions 150 on the surface 145 depends on several factors. Specifically, the size of the interacting region or regions 150 is directly correlated with the transverse size and the first beam direction $\Omega 1$ of the light beam 110. The transverse size of the light beam 110 is the area of the light beam 110 along a direction transverse (for example, perpendicular) to the first beam direction $\Omega 1$. The shape of the interacting region or region 150 depends on the shape of the light beam 110 along its transverse direction. As the optical element 105 is rotated about the axis of rotation 165, the interacting region is swept across the surface 145 because the light beam 110 itself can remain unaltered and thus, is kept at the first beam direction $\Omega 1$. The number of interacting regions 150 on the surface 145 depends on how often the optical element 105 is rotated and by how much the optical element 105 is rotated about the axis of rotation 165. Specifically, this relates to the angle that is swept during a single rotation of the optical element 105 across about the axis of rotation 165. The number of interacting regions 150 also depends on the relative size between the transverse area of the light beam 110 and the area of the surface 145. Moreover, interacting regions 150 can overlap at least partially with each other. For example, in some implementations, the area of the light beam 110 is about 1-20% of the area of the surface 145 and thus the area of each interacting region 150 is also about 1-20% of the area of the surface 145.

Figure 3A:
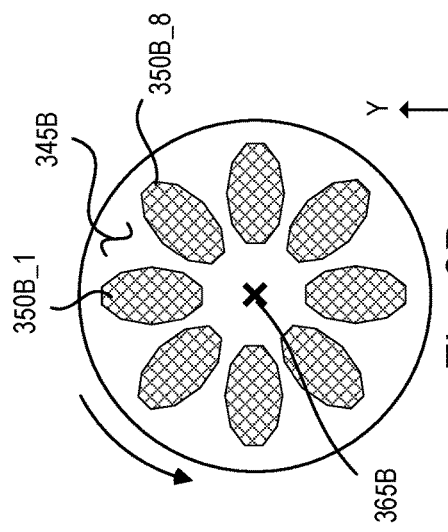
FIGS. 3A-3E are side plan views of a surface of the optical element showing different implementations of the possible interacting regions.

For example, as shown in FIG. 3A, a surface 345A of an optical element 305A can be divided into four interacting regions 350A_1, 350A_2, 350A_3, and 350A_4 because the optical element 305A is rotated four times in 90° increments about a 360° range. Thus, for example, the light beam 110 interacts with the interacting region 350A_1 at a first time period, the optical element 305A is rotated by 90° from a position at which the light beam 110 interacts with the interacting region 350A_1 to a position at which the light beam 110 interacts with the interacting region 350A_2. The light beam interacts with the interacting region 350A_2 for a second time period, then the optical element 305A is rotated by another 90° until the light beam interacts with the interacting region 350A_3. The light beam interacts with the interacting region 350A_3 for a third time period, then the optical element 305A is rotated by another 90° until the light beam 110 interacts with the interacting region 350A_4, where it remains for the fourth time period. After the end of the fourth time period, the optical element 305A is rotated another 90° until the light beam 110 interacts with the interacting region 350A_1.

Figure 3B:
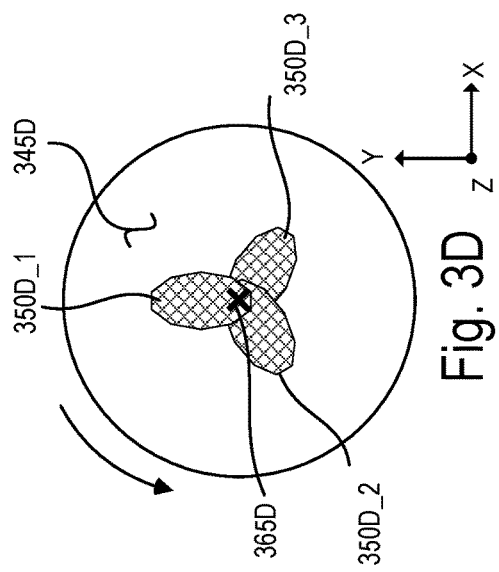
Figure 3E:
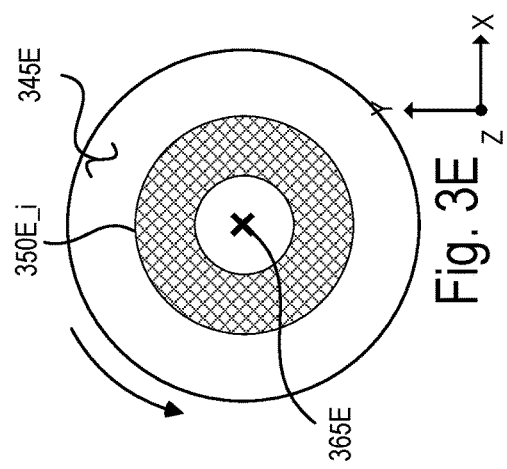
Figure 3C:
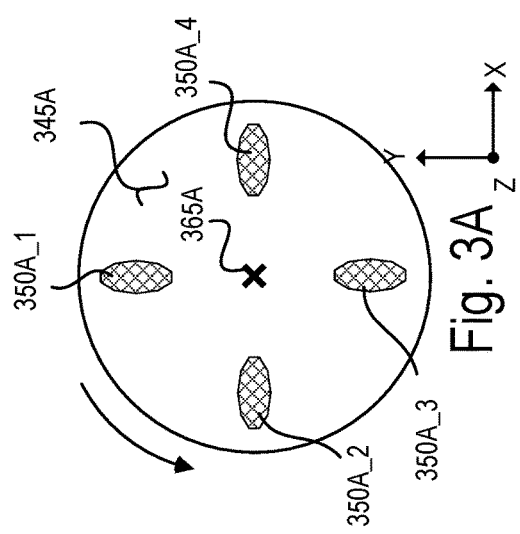

As shown in FIG. 3B, a surface 345B of an optical element 305B can be divided into eight interacting regions 350B_1, 350B_2, . . . 350B_8 because the optical element 305B is rotated eight times in 45° increments through a 360° range. As shown in FIG. 3C, a surface 345C of an optical element 305C can be divided into twelve interacting regions 350C_1, 350C_2, . . . 350C_12 because the optical element 305C is rotated twelve times in 30° increments about a 360° range.

Figure 3D:
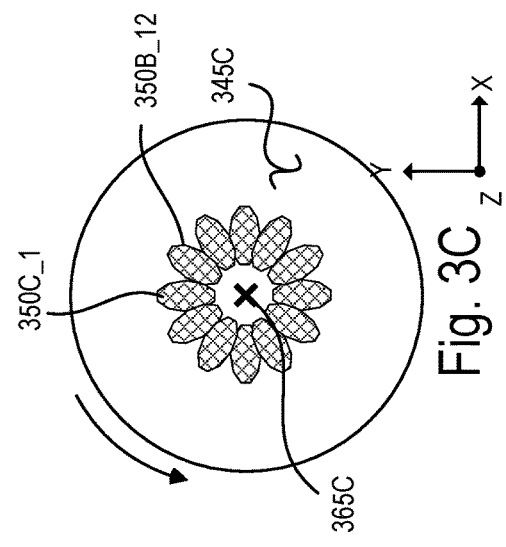

As shown in FIG. 3D, a surface 345D of an optical element 305D can be divided into three interacting regions 350D_1, 350D_2, and 350D_3 because the optical element 305B is rotated three times in 120° increments about a 360° range. In this example, each of the interacting regions 350D_1, 350D_2, 350D_3 of the optical element 305D overlaps with the other interacting regions of the optical element 305D. An interacting region can overlap with other interacting regions of the optical element depending on the transverse size of the light beam 110 and also the number of rotational increments.

The time period during which the light beam 110 interacts with an interacting region 150 can be any suitable length, such as, for example, one day, one month, one week, several months, or one minute, or any portion or multiple of these times. The time period during which the light beam 110 interacts with each interacting region 150 can be varied during use of the optical system 115, depending on external factors. For example, the amount of time during which the light beam 110 is incident on the optical element 105 can be based on the time it takes for the surface 145 (which can be a coating) or the bulk material that supports the surface 145 to become damaged. In an application in which the optical element 105 is rotated, the light beam 110 is effectively spread over the circumference of a circle with a center at the axis of rotation 165 and a radius to the interacting region 150 that the light beam 110 is incident upon.

It is possible to rotate the optical element 105 in a first set of angular increments (for example, 120°) for a first period of time, and then rotate that same optical element 105 in a second set of angular increments (for example, 30°) for a second period of time. It is possible for the interacting regions 150 on the surface 145 to overlap with each other, such as shown in FIGS. 3C and 3D.

It is alternatively possible to rotate the optical element 105 continuously about the axis of rotation 165 so that there are an infinite number of interacting regions 150 defined by a toroid across the surface. Such an implementation is shown in FIG. 3E where each interacting region is given by 350E_i, where i is any plural integer.

Figure 4:
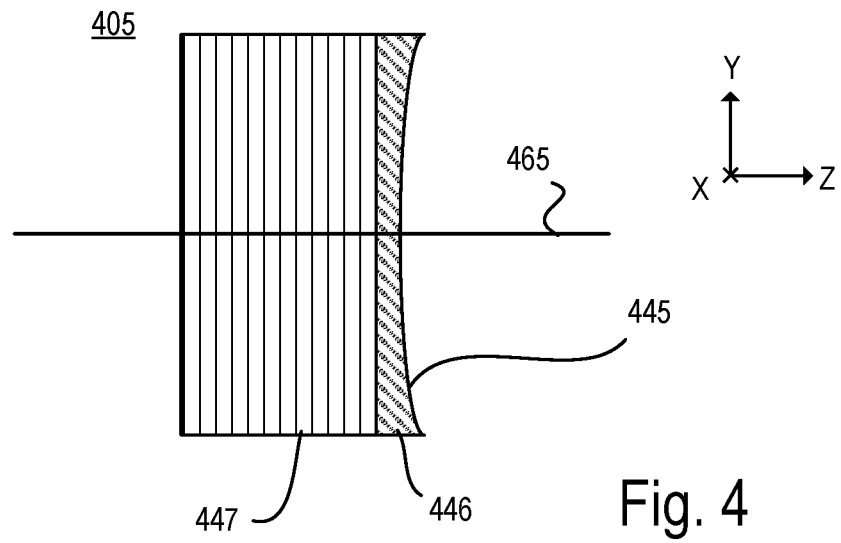
FIG. 4 is a cross sectional view of an exemplary reflective optical element of the apparatus of FIG. 1A.

Referring to FIG. 4, a cross section of an implementation of an optical element 105 is shown. In FIG. 4, the optical element 105 is a reflective optical element 405, such as a mirror that has a reflecting surface 445 that interacts with the light beam 110 by reflecting at least a percentage of the light beam 110. The reflecting surface 445 is formed as a coating on a substrate 446. The coating should be highly reflective at the wavelength range of the light beam 110. The coating can be a dielectric multilayer, a dielectric-enhanced metal, or a bare metal coating, depending on the wavelength of the light beam 110. The substrate 446 can be any metal or glass material commonly used for mirror fabrication such as, for example, calcium fluoride (CaF2) or fused silica. In some implementations, the coating is a stack of dielectric materials each having alternating index of refractions. In other implementations, the coating is a highly reflective coating such as a maximum metal reflector (MMR) coating produced by II-VI of Saxonburg, Pa. and the substrate 446 is silicon. Other coatings that can be used include gold and silver, and other substrates 446 to which the coating can be applied include oxygen-free high conductivity (OFHC) copper, molybdenum, and aluminum. The substrate 446 can be attached (for example, adhered or mounted) to a plate 447, which can be made of a suitable material such as aluminum. If appropriate, the substrate 446 can be merged with the plate 447 into a single component.

In this implementation, the reflecting surface 445 is curved and concave (also called converging) because the surface 445 is bulging inward near the axis of rotation 465 and toward the substrate 446. The concave shape can be spherical, or another suitable shape, depending on the focal length of the surface 445 and also on the transverse size of the light beam 110. For example, for an f-number that is higher than about 10, the concave shape can be spherical but for an f-number that is lower than about 10, the concave shape can be an off-axis paraboloid to reduce the off-axis aberrations (such as spherical aberrations or coma) in the light beam 110. The f-number is the ratio of the focal length of the surface 445 to the transverse diameter of the light beam 110.

The plate 447 and/or combination of the plate 447 and the substrate 446 can be movable attached to the actuator 160 or to the alignment system 155. The actuator 160 is configured to rotate the optical element 405 and also the reflective surface 445 about the axis of rotation 465. The connection between the plate 447 and the substrate 446 with the actuator 160 or the alignment system 155 is provided in such a way to enable the adjustment of the location of the interacting region 150 at which the light beam 110 interacts with the surface 445 while the light source 120 is operating. For example, the actuator 160 can be configured to rotate a shaft connected to the optical element 405 along its axis of rotation 465.

Figure 5:
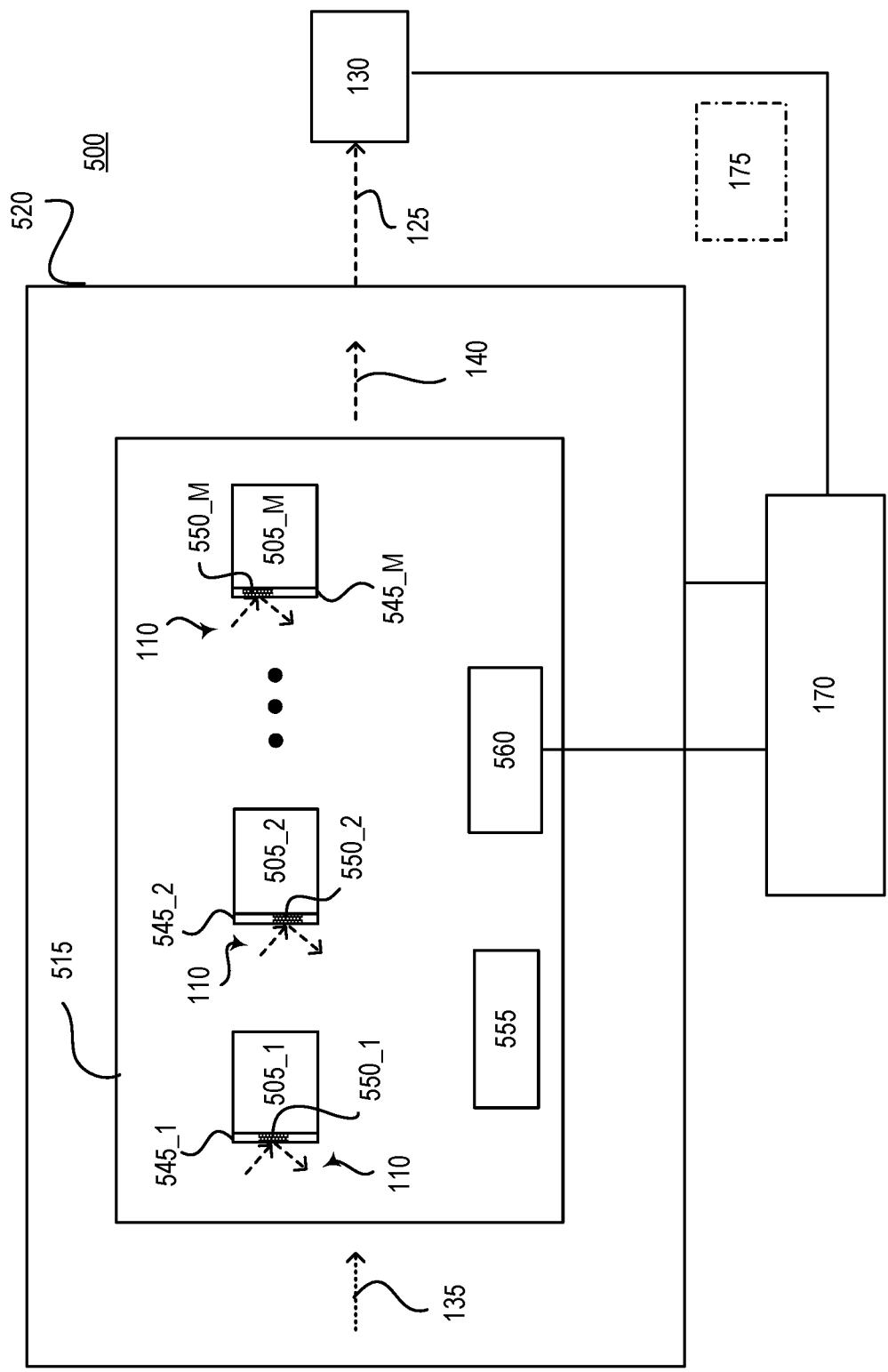
FIG. 5 is a block diagram of an optical system having a plurality of optical elements that interact with the light beam, each optical element having adjustable interacting regions.

Referring to FIG. 5, in some implementations, the apparatus 100 is configured as an apparatus 500 to reduce optical damage to a plurality of optical elements 505_1, 505_2, . . . 505_M (where M is an integer greater than one) within an optical system 515 of a light source 520. In such an implementation, each optical element 505_i includes a respective surface 545_i that interacts with the light beam 110 at a respective interacting region 550_i. An alignment system 555 is used in general to align the light beam 110 relative to each optical element surface 545_i and thus the alignment system 555 can include a plurality of components, with a subset of components configured for aligning the light beam 110 relative to a specific optical element surface 545_i. Additionally, an actuator system 560 is designed to adjust the location of each of the interacting regions 550_i at respective surfaces 545_i. For example, the actuator system 560 can include a plurality of actuators, with each actuator being associated with a particular optical element 505_i.

Figure 6:
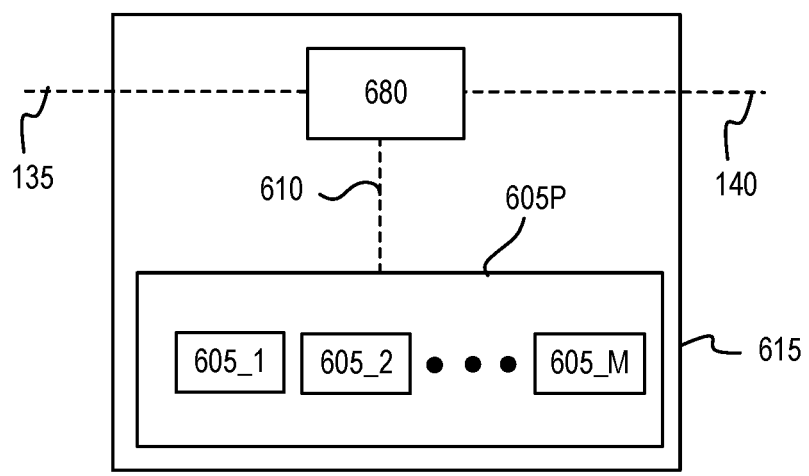
FIG. 6 is a block diagram of an optical system designed as an optical temporal pulse stretcher.

Referring to FIG. 6, an optical temporal pulse stretcher 615 is an example of an optical system 515 in which the plurality of optical elements 505_1, 505_2, . . . 505_M are a plurality 605P of reflective optical elements 605_1, 605_2, . . . 605_M that each interact with the light beam 110. The optical temporal pulse stretcher 615 is a part of an apparatus 100 that is configured to reduce the optical damage to each reflective optical element 605_i by adjusting the location of the interacting region 650_i at which the light beam 110 interacts with each reflective optical element 605_i.

The optical temporal pulse stretcher 615 is configured to increase a duration of the pulses of the light beam 135 that pass through it to thereby output a modified light beam 140. The optical temporal pulse stretcher 615 optically acts on the pulse of the light beam 135 to increase a duration of the pulse without introducing significant losses so that the peak power of the light beam 135 is reduced without reducing its average power. The optical temporal pulse stretcher 615 is an optical and passive configuration of optical elements that split the amplitude of the pulse of the light beam 135 into split portions 610 with one or more beam separators 680. Optical delays are introduced among these split portions using the plurality 605P of reflective optical elements, and then these temporally-delayed portions of the pulse are recombined (for example, using the beam separator 680) to provide a temporally stretched pulse of the light beam 140 at the output. The optical temporal pulse stretcher 615 can therefore include optical components such as beam splitters (for the beam separator 680) and reflective optical elements 605P (that form the optical delay). The reflective optical elements 605P can be flat mirrors or curved (for example, concave or convex) mirrors that could be confocal. The delay introduced in the split portion of the pulse produced by the optical temporal pulse stretcher 615 is equal to or longer than the fast temporal component of the light beam 135.

FIG. 7 shows an example of an optical temporal pulse stretcher 715. The optical temporal pulse stretcher 715 includes a first set 705a of reflective optical elements and a second set 705b of reflective optical elements, where the reflective optical elements of the sets 705a, 705b each include concave reflecting surfaces. An open region 785 is defined between the sets 705a, 705b, and across which the light beam split portions 610 travel. The reflecting surfaces of the sets 705a, 705b generally face in toward the open region 785. Moreover, the reflecting surfaces of the sets 705a, 705b are arranged relative to each other so that the light beam split portions 610 are reimaged from one reflective optical element to a next reflective optical element. The optical temporal pulse stretcher 715 also includes an entrance or opening 790 for receiving the light beam 135 and an exit 792 through which the outputted light beam 140 is transmitted after the light beam split portions 610 have bounced back and forth within the region 785 and recombined at the exit 792. The reflective optical elements of each set 705a, 705b are mirrors.

Figure 8:
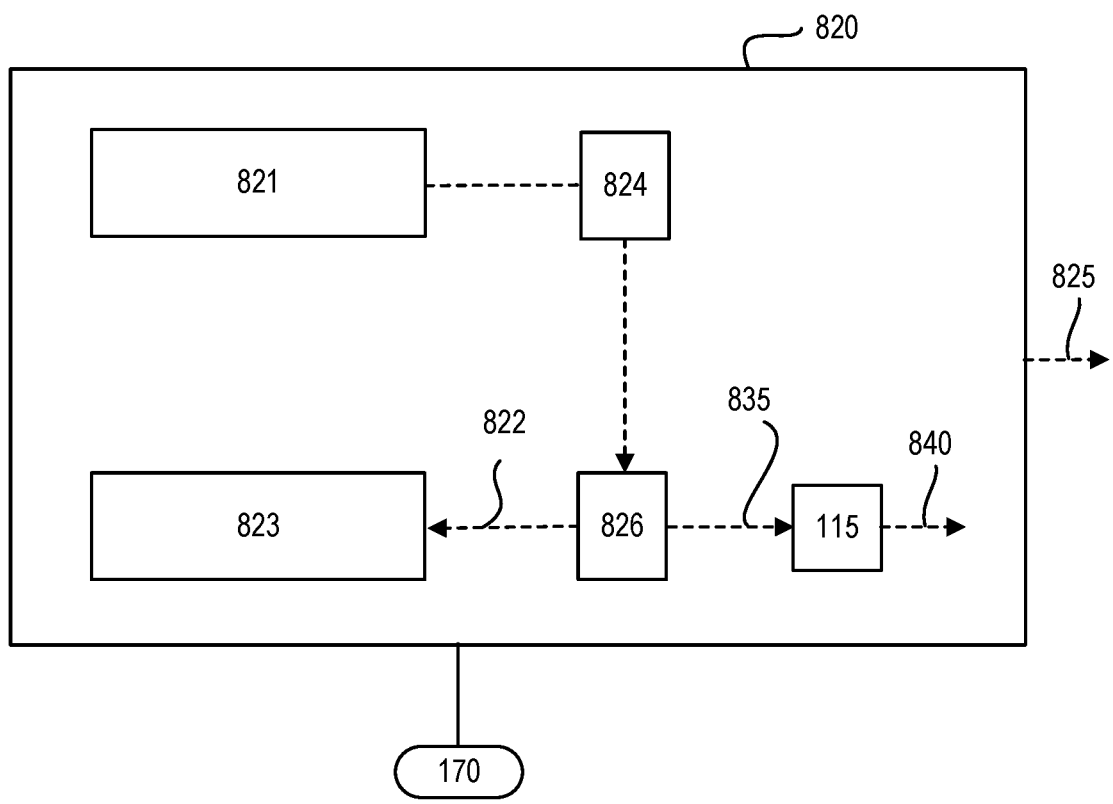
FIG. 8 is a block diagram of a deep ultraviolet (DUV) light source in which the optical system is placed.

Referring to FIG. 8, in some implementations in which the light beam has a wavelength in the DUV range, the optical system 115 is placed within a light source 820 that is configured as a multi-stage light source and produces as the light beam 140 a pulsed light beam 840, which can then be output from the light source 820 as a pulsed output light beam 825 toward the output apparatus 130. The light source 820 is a two-stage laser system that includes a master oscillator (MO) arrangement 821 that provides a seed light beam 822 to a power amplifier (PA) arrangement 823. The MO arrangement 821 typically includes a gain medium in which amplification occurs and an optical feedback mechanism such as an optical resonator. The PA arrangement 823 typically includes a gain medium in which amplification occurs when seeded with the seed light beam 822 from the MO arrangement 821. If the PA arrangement 823 is designed to include a regenerative ring resonator then it is described as a power ring amplifier (PRA) arrangement, and in this case, enough optical feedback can be provided from the ring design. The MO arrangement 821 enables fine tuning of spectral parameters such as the center wavelength and the bandwidth at relatively low output pulse energies (when compared with the output of the PA arrangement 823). The PA arrangement 823 receives the seed light beam 822 from the MO arrangement 821 and amplifies the seed light beam 822 to attain the necessary powers for output to use in the output apparatus 130 (for example, for photolithography). The PA arrangement 823 outputs a pulsed light beam 835.

The MO arrangement 821 includes a discharge chamber having two elongated electrodes, a laser gas that serves as the gain medium, a fan for circulating the gas between the electrodes. A laser resonator is formed between a spectral feature selection system on one side of the discharge chamber and an output coupler on a second side of the discharge chamber. The light source 820 can also include other optical features such as a line center analysis module (LAM) 824 that receives an output from the output coupler of the MO arrangement 821 and a beam modification optical system 826. The LAM 824 is an example of one type of measurement unit that can be used to measure a spectral feature such as a wavelength (for example, the center wavelength) of the seed light beam 822. The beam modification optical system 826 can modify the size and/or shape of the seed light beam 822 or the pulsed light beam 835 as needed.

The laser gas used in the discharge chamber can be any suitable gas for producing a laser beam around the required wavelengths and bandwidth, for example, the laser gas can be argon fluoride (ArF), which emits light at a wavelength of about 193 nm, or krypton fluoride (KrF), which emits light at a wavelength of about 248 nm.

The PA arrangement 823 includes a power amplifier discharge chamber, and, if it is a regenerative ring amplifier, the power amplifier also includes a beam return (such as a reflector) that returns (via reflection, for example) the light beam back into the discharge chamber to form a circulating and looped path (in which the input into the ring amplifier intersects the output out of the ring amplifier). The power amplifier discharge chamber includes a pair of elongated electrodes, a laser gas that serves as the gain medium, and a fan for circulating the gas between the electrodes. The seed light beam 822 is amplified by repeatedly being passed through the PA arrangement 823. The beam modification optical system 826 a way (for example, a partially-reflecting mirror) to in-couple the seed light beam 822 to the PA arrangement 823 and to out-couple a portion of the amplified radiation from the PA arrangement 823 to form the output light beam 835.

Spectral features of the seed light beam 822 (and therefore the output light beam 835) are determined by the configuration of the MO arrangement 821, and these spectral features can be adjusted by adjusting a light beam that is produced within the MO arrangement 821. The MO arrangement 821 is configured to finely tune the spectral output of the light beam 835 produced by the light source 820 by finely tuning the spectral features of the light beam within the MO arrangement 821 based on the input from the control system 170.

The optical system 115 is placed in the path of the light beam 835 that is output from the PA arrangement 823 of the light source 820. Because the light beam 835 is more powerful than the seed light beam 822, the optical elements 105 within the optical system 115 are more susceptible to damage from interacting with the light beam 835. Accordingly, the optical system 115 is configured so that the surfaces 145 of one or more of its optical elements 105 are adjusted to thereby adjust the respective interacting regions 150 while the light beam 835 is directed to the optical system 115. The optical system 515 is one example of an optical system 115 that can be placed in the path of the light beam 835 that is output from the PA arrangement 823. The optical temporal pulse stretcher 615 or 715 are other examples of an optical system 115 that can be placed in the path of the light beam 835 that is output from the PA arrangement 823.

Referring to FIG. 9, in some implementations in which the light beam has a wavelength in the DUV range, the output apparatus 130 is a photolithography exposure apparatus 930 for patterning the wafer 931. The photolithography exposure apparatus 930 includes an optical arrangement that includes an illuminator system 932 having, for example, one or more condenser lenses, a mask, and an objective arrangement. The mask is movable along one or more directions, such as along an optical axis OA of the light beam 125 or in a plane that is perpendicular to the optical axis OA. The objective arrangement includes a projection lens and enables the image transfer to occur from the mask to the photoresist on the wafer 932. The illuminator system 932 adjusts the range of angles for the light beam 125 impinging on the mask. The illuminator system 932 also homogenizes (makes uniform) the intensity distribution of the light beam 125 across the mask. The photolithography exposure apparatus 930 can include, among other features, a lithography controller 933, air conditioning devices, and power supplies for the various electrical components. The lithography controller 933 controls how layers are printed on the wafer 931. The lithography controller 933 is connected to the control system 170.

The wafer 931 is irradiated by the light beam 125. A process program or recipe determines the length of the exposure on the wafer 931, the mask used, as well as other factors that affect the exposure. During lithography, a plurality of pulses of the light beam 125 illuminates the same area of the wafer 931 to form an illumination dose. The number P of pulses of the light beam 125 that illuminate the same area of the wafer 931 can be referred to as an exposure window or slit and the size of this slit can be controlled by an exposure slit placed before the mask. In some implementations, the value of P is in the tens, for example, from 10-100 pulses. In other implementations, the value of P is greater than 100 pulses, for example, from 100-500 pulses. One or more of the mask, the objective arrangement, and the wafer 931 can be moved relative to each other during the exposure to scan the exposure window across an exposure field. The exposure field is the area of the wafer 931 that is exposed in one scan of the exposure slit or window.

In order to pattern the wafer 931, the light beam 125 has a wavelength in the deep ultraviolet (DUV) range, which is between 10 nm and 400 nm. In an implementation in which the light source 120 uses a gas discharge design filled with a gain medium that includes argon fluoride (ArF), then the light beam 125 can have a wavelength of about 193 nm. In an implementation in which the light source 120 uses a gas discharge design filled with a gain medium that includes krypton fluoride (KrF) then the light beam 125 can have a wavelength of about 248 nm. The spectral features of the light beam 125 have a direct impact on the quality of imaging at the wafer 931. Specifically, the size and shape of the microelectronic features patterned on the wafer 931 depend on the optical spectrum of the light beam 125. In general, the smaller the wavelength of the light beam 125, the smaller the features than can be patterned.

The control system 170 includes one or more electronic processors, electronic storage, an input/output (I/O) interface, and an actuation module. The actuation module can provide the command to the actuator 160 (if the actuator 160 is an automatic actuator as opposed to a manual actuator) to adjust the interacting region 150 of the surface 145. This command can be based on the measurements from the measurement apparatus 175 and thus the actuation module can also analyze the measurements from the measurement apparatus 175 to determine the appropriate command for sending to the actuator 160. If the actuator 160 is a human operator, then the I/O interface can be commanded by the actuation module within the control system 170 to provide a signal to the human operator to adjust the interacting region 150 of the surface 145.

The electronic storage can be volatile memory, such as RAM, or non-volatile memory. In some implementations, the electronic storage includes non-volatile and volatile portions or components. The electronic storage can store data and information that is used in the operation of the control system 170 and/or components of the control system 170. The information can be stored in, for example, a look-up table or a database.

The electronic storage also can store instructions, perhaps as a computer program, that, when executed, cause the processor or processors to communicate with components in the control system 170, the light source 120, and/or the output apparatus 130.

The I/O interface is any kind of electronic interface that allows the control system 170 to receive and/or provide data and signals with an operator, the light source 120, and the output apparatus 130, and/or an automated process running on another electronic device. For example, the I/O interface can include one or more of a visual display, a keyboard, and a communications interface.

Figure 10:
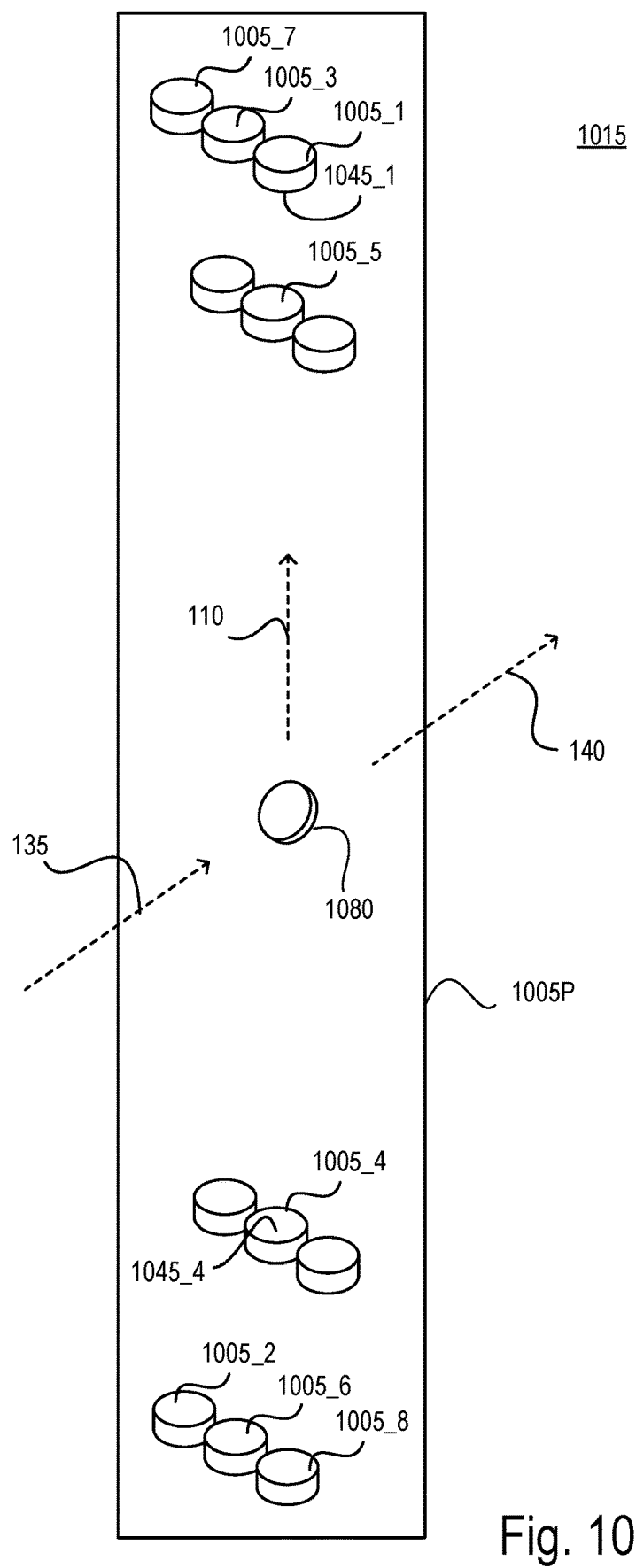
FIG. 10 is a perspective view of another implementation of an optical system designed as an optical temporal pulse stretcher.
Figure 11:
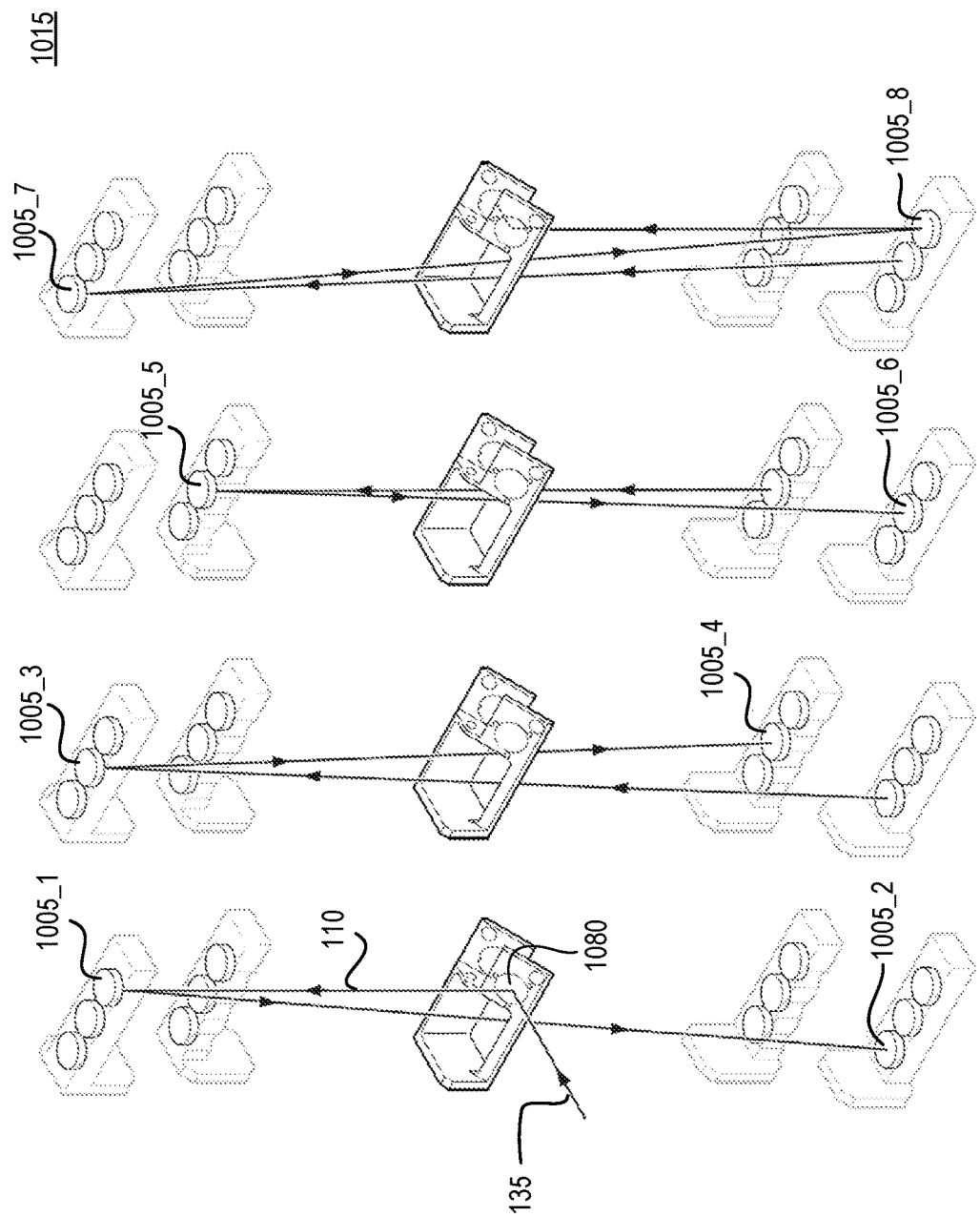
FIG. 11 is a perspective view of the optical temporal pulse stretcher of FIG. 10, showing an implementation of the path of the light beam.

FIG. 10 shows another example of an optical temporal pulse stretcher 1015. The optical pulse stretcher 1015 includes a plurality 1005P of reflective optical elements 1005_$i$ that interact with the light beam 110. Optical elements 1005_1-1005_8 of the plurality 1005P are labeled and the interacting surfaces 1045_1 and 1045_4 of respective optical elements 1005_1 and 1005_4 are labeled in FIG. 10. The interacting surfaces 1045_$i$ of the optical elements 1005_$i$ are curved and concave, and in this example, are spherical. The optical pulse stretcher 1015 also includes at least one beam separator 1080. The beam separator 1080 is configured to divide the light beam 110 from the light beam 135 while the beam separator 1080 is also configured to combine the portions of the light beam 110 with each other to recombine to form the light beam 140. FIGS. 11A and 11B show an exemplary path of the light beam 110 through the optical temporal pulse stretcher 1015. FIG. 11 shows one implementation of at least some of the path of the light beam 110 that traverses the optical temporal pulse stretcher 1015. Other paths are possible, depending on the placement of the beam separator 1080.

Figure 12:
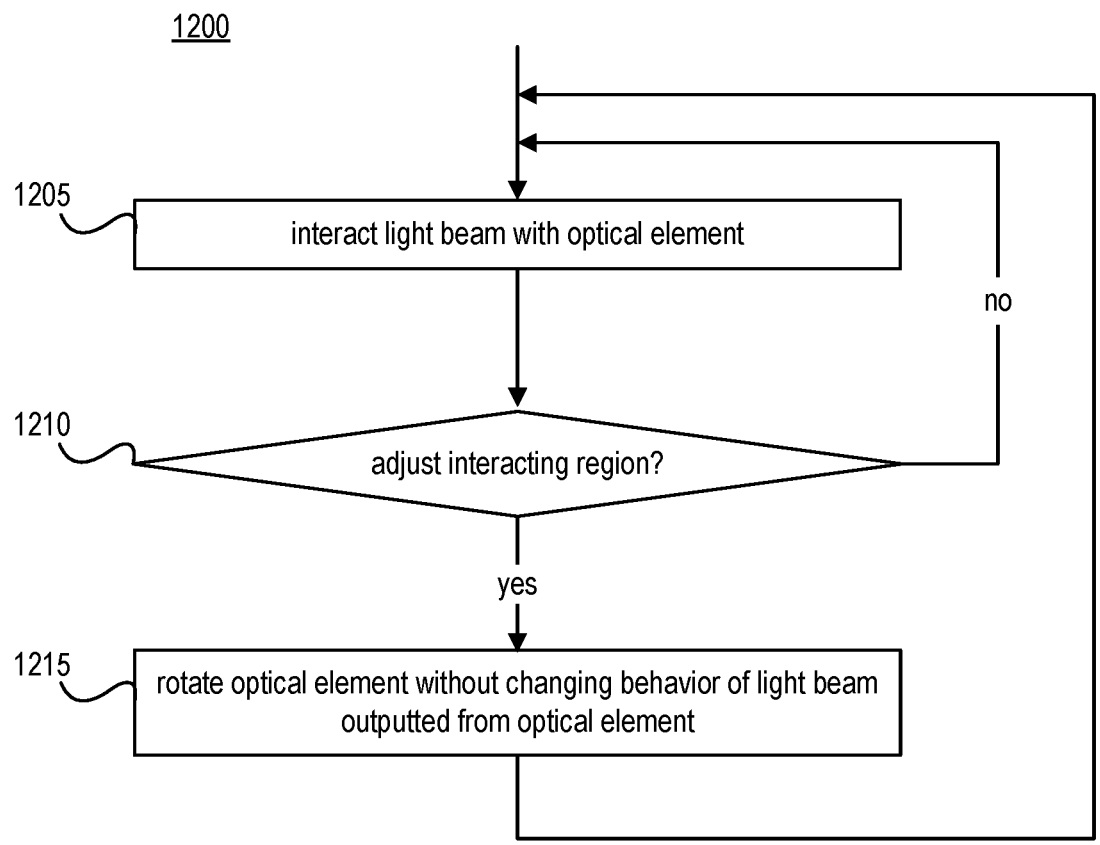
FIG. 12 is a flow chart of a procedure for reducing optical damage on the optical element of FIGS. 1A and 1B.

Referring to FIG. 12, a procedure 1200 is performed for reducing optical damage on the optical element 105. The light beam 110 is interacted with the optical element 105 (1205). Specifically, the light beam 110 is directed toward the optical element 105 along the first beam direction $\Omega 1$ to thereby interact the light beam 110 with the optical element 105. Moreover, the light beam 110 is outputted from the optical element 105 along the second beam direction $\Omega 2$ after the light beam 110 and optical element 105 have interacted.

It is determined whether to adjust the interacting region 150 (1210). The determination (1210) can be made by a human operator observing some aspect of the interaction or the optical element 105. This determination (1210) can be based on a period of time that has passed since the last time the interacting region 150 was adjusted. This determination (1210) can therefore be made periodically after a pre-determined period of time has passed since the last time the interacting region 150 was adjusted.

In some implementations, the determination to adjust the interacting region 150 (1210) can be made after detecting damage to the optical element 105 (for example, to the surface 145 or the substrate supporting the surface 145). Such damage can be due to a change in performance of the apparatus 100. The damage can be visually verified. In other implementations, the determination to adjust the interacting region 150 (1210) can be made based on the number of pulses of the light beam 125 that have been directed to the output apparatus 130 since the last time and adjustment was performed. For example, if the number of pulses of the light beam 125 that have been directed to the output apparatus 130 exceeds a pre-determined value, then it is determined that the interacting region 150 should be adjusted (1210). In this implementation, the pre-determined value can be selected to reduce the change of damage to the optical element 105 due to its interaction with the light beam 110. If the optical element 105 degrades by way of a temporal process that is independent of operating conditions within the apparatus 100, such as degradation due to the environment or inherent un-aided degradation, then a time-based adjustment to the interacting region 150 (1210) can be appropriate.

If it is determined that the interacting region 150 needs to be adjusted (1210), then the optical element 105 is rotated without changing the overall behavior of the light beam 110 outputted from optical element 105 (1215). For example, the optical element 105 is rotated by rotating the optical element 105 about its axis of rotation 165. Before the rotation is performed (1215), the light beam 110 interacts with the optical element at a first interacting region (for example, region 250A of the optical element 205), and the outputted light beam is directed along the second beam direction $\Omega 2$. Moreover, after the rotation is performed (1215), the light beam 100 interacts with the optical element at a second interacting region (for example, region 250B of the optical element 205) that is distinct from the first interacting region and the outputted light beam 110 remains directed along the second beam direction $\Omega 2$. In this way, the overall behavior of the light beam 110 outputted from the optical element 105 has not been changed or modified by the rotation 1215.

The rotation of the optical element 105 (1215) is performed while the light beam 110 is interacting with the optical element 105 (1205). The rotation of the optical element 105 (1215) can be performed at a particular rate, that is, each rotation at 1215 can be performed after a specific period of time and the rotation itself can be performed at a particular speed. In some implementations, the rotation of the optical element 105 (1215) about the axis of rotation 165 can be performed continually and in this particular case, the answer at 1210 will always be yes during continual operation.

Other implementations are within the scope of the following claims.

What is claimed is:

1. An apparatus for reducing optical damage on an optical element that interacts with a light beam, the apparatus comprising:
   an optical system within an ultraviolet light source, the optical system being configured to interact with a light beam to perform a modification to one or more aspects of the light beam, the optical system comprising an optical temporal pulse stretcher and the modification performed to the light beam comprising increasing a duration of the pulses of the light beam,
      wherein the optical system comprises at least one optical element having a surface configured to interact with the light beam, the surface being continuous and non-diffuse;
   an alignment system configured to align the light beam relative to the optical element surface so that the light beam interacts with the optical element while the light beam is traveling at a first beam direction relative to the surface of the optical element and the light beam is outputted from the optical element along a second beam direction relative to the surface of the optical element after the light beam and optical element have interacted; and
   an actuator physically coupled to the optical element and configured to perform a rotation of the optical element about an axis of rotation;
   wherein, during the interaction between the light beam and the optical element:
      before the rotation, the light beam interacts with the optical element at a first region of the optical element and while traveling at the first beam direction, and the outputted light beam is directed along the second beam direction;
      after the rotation, the light beam interacts with the optical element at a second region of the optical element that is distinct from the first region and while traveling at the first beam direction, and the outputted light beam remains directed along the second beam direction; and
      the modification performed to one or more aspects of the light beam does not change due to the rotation of the optical element.

2. The apparatus of claim 1, wherein the optical temporal pulse stretcher is a passive optical element.

3. The apparatus of claim 1, wherein the at least one optical element includes a mirror within the optical temporal pulse stretcher.

4. The apparatus of claim 1, wherein the optical temporal pulse stretcher includes a beam separator that divides the light beam into a portion that is directed into an arrangement of a plurality of mirrors, and wherein the at least one optical element includes the mirrors of this arrangement.

5. The apparatus of claim 1, wherein the optical element includes a mirror having a reflective surface that interacts with the light beam.

6. The apparatus of claim 5, wherein the mirror is a concave mirror.

7. The apparatus of claim 6, wherein the reflective surface of the mirror is a spherical surface.

8. The apparatus of claim 1, wherein the optical element is rotationally symmetrical about its centroid, which corresponds to the axis of rotation, and the first and second regions of the optical element are offset from the centroid of the optical element.

9. The apparatus of claim 1, wherein the light beam is reflected from the optical element along the second beam direction.

10. The apparatus of claim 1, wherein the actuator is configured to rotate the optical element about the axis of rotation while the light beam is interacting with the optical element.

11. The apparatus of claim 1, wherein at least some of the second region of the optical element overlaps with the first region of the optical element.

12. The apparatus of claim 1, wherein the optical element is configured to withstand a power of the light beam and to optically interact with a light beam having a wavelength in the deep or extreme ultraviolet range.

13. The apparatus of claim 1, wherein the actuator comprises one or more of: a servo motor, stepper motor, piezo actuator, piezo inch-worm, and pneumatic actuator mechanically linked to the optical element.

14. The apparatus of claim 1, further comprising a control system coupled to the actuator, wherein the control system is configured to send a signal to the actuator to rotate the optical element about the axis of rotation.

15. An apparatus for reducing optical damage on an optical element that interacts with a light beam, the apparatus comprising:
an optical system within an ultraviolet light source, the optical system being configured to interact with a light beam to perform a modification to one or more aspects of the light beam, wherein the optical system comprises at least one optical element having a surface configured to interact with the light beam, the surface being continuous and non-diffuse;
an alignment system configured to align the light beam relative to the optical element surface so that the light beam interacts with the optical element while the light beam is traveling at a first beam direction relative to the surface of the optical element and the light beam is outputted from the optical element along a second beam direction relative to the surface of the optical element after the light beam and optical element have interacted; and
an actuator physically coupled to the optical element and configured to perform a rotation of the optical element about an axis of rotation;
a control system coupled to the actuator, wherein the control system is configured to send a signal to the actuator to rotate the optical element about the axis of rotation;
a measurement apparatus coupled to the control system, wherein the measurement apparatus is configured to measure one or more characteristics of the optical system and the control system sends a signal to the actuator based on the measured one or more characteristics;
wherein, during the interaction between the light beam and the optical element:
before the rotation, the light beam interacts with the optical element at a first region of the optical element and while traveling at the first beam direction, and the outputted light beam is directed along the second beam direction;
after the rotation, the light beam interacts with the optical element at a second region of the optical element that is distinct from the first region and while traveling at the first beam direction, and the outputted light beam remains directed along the second beam direction; and
the modification performed to one or more aspects of the light beam does not change due to the rotation of the optical element.

16. A method for reducing optical damage on an optical element, the method comprising:
directing a light beam toward the optical element along a first beam direction to thereby interact the light beam with a surface of the optical element, the surface being continuous and non-diffuse;
outputting the light beam from the optical element along a second beam direction after the light beam and optical element have interacted;
measuring one or more characteristics of an optical system that includes the optical element; and
performing a rotation of the optical element about an axis of rotation based on an analysis of the measured one or more characteristics;
wherein:
before the rotation, the light beam interacts with the optical element at a first region of the optical element surface, and the outputted light beam is directed along the second beam direction, and
after the rotation, the light beam interacts with the optical element at a second region of the optical element surface that is distinct from the first region and the outputted light beam remains directed along the second beam direction.

17. The method of claim 16, wherein the optical element is rotationally symmetrical about its centroid, which is at the axis of rotation, and the first and second regions of the optical element surface are offset from the centroid of the optical element.

18. The method of claim 16, wherein outputting the light beam from the optical element along the second beam direction after the light beam and the optical element have interacted comprises reflecting the light beam from the optical element surface along the second beam direction.

19. The method of claim 16, wherein the rotation of the optical element about the axis of rotation is performed while the light beam is interacting with the optical element surface.

20. The method of claim 16, wherein at least some of the second region of the optical element surface overlaps with the first region of the optical element surface.

21. The method of claim 16, wherein the optical element is configured to interact with light having a wavelength in the deep or extreme ultraviolet range.

22. The method of claim 16, wherein performing the rotation of the optical element about the axis of rotation comprises rotating the optical element about the axis of rotation repeatedly and at a particular rate.

23. The method of claim 16, wherein performing the rotation of the optical element about the axis of rotation comprises rotating the optical element about the axis of rotation continually.

24. An optical temporal pulse stretcher within an ultraviolet light source, the optical temporal pulse stretcher comprising:
 a plurality of reflective optical elements configured to increase a duration of pulses of a light beam, each reflective optical element including a reflective surface configured to receive the light beam and to produce an outputted light beam and to change a beam direction of the outputted light beam relative to the light beam;
 an alignment system configured to align the light beam relative to reflective surfaces of the reflective optical elements; and
 an actuator physically coupled to at least one of the reflective optical elements and configured to perform a rotation of the reflective optical element about an axis of rotation;
 wherein, during the interaction between the light beam and the reflective optical element:
  before the rotation, the light beam interacts with the reflective optical element at a first region of the reflective optical element and while traveling at a first beam direction, and an outputted light beam is directed along a second beam direction; and
  after the rotation, the light beam interacts with the reflective optical element at a second region of the reflective optical element that is distinct from the first region and while traveling at the first beam direction, and the outputted light beam remains directed along the second beam direction.

25. The optical temporal pulse stretcher of claim 24, wherein the surface of each reflective optical element is continuous and non-diffuse.

* * * * *